C. GREBENSTEIN.
RUNNER ATTACHMENT FOR WHEELED VEHICLES.
APPLICATION FILED FEB. 7, 1919.
1,326,724.
Patented Dec. 30, 1919.
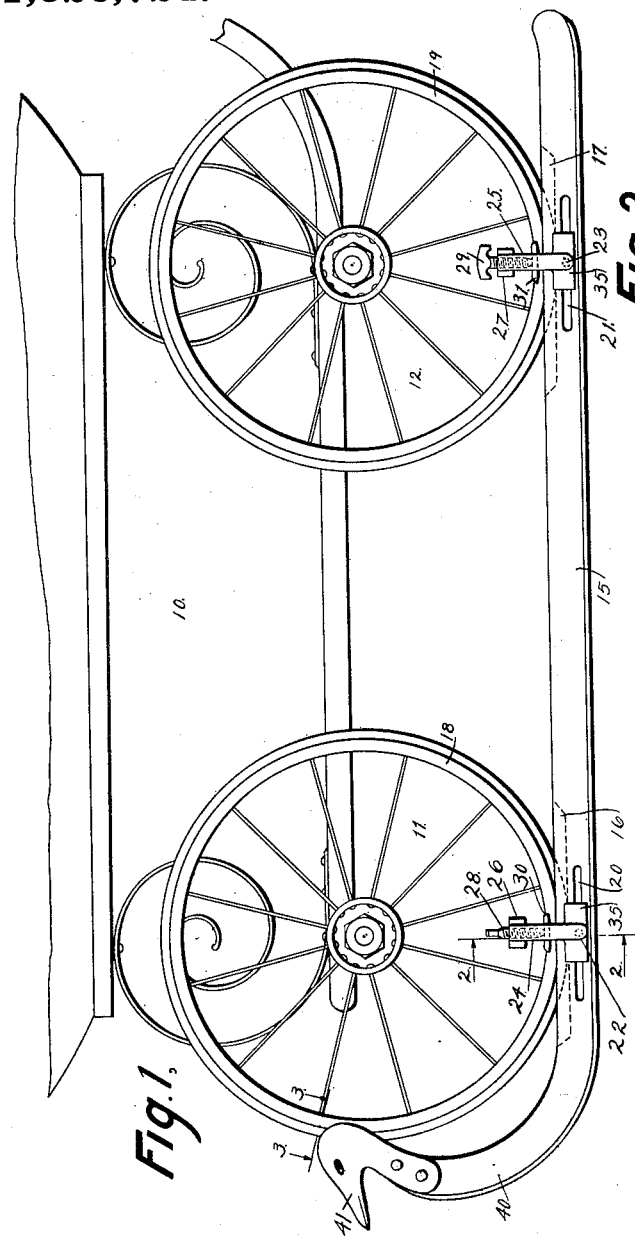
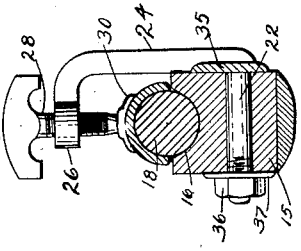
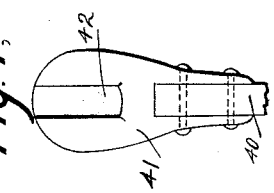
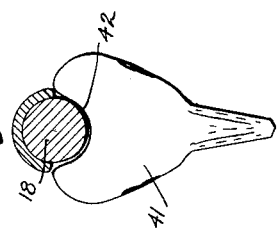
WITNESSES
INVENTOR
C. GREBENSTEIN.
BY
ATTORNEYS

UNITED STATES PATENT OFFICE.

CHARLES GREBENSTEIN, OF BROOKLYN, NEW YORK.

RUNNER ATTACHMENT FOR WHEELED VEHICLES.

1,326,724.

Specification of Letters Patent.

Patented Dec. 30, 1919.

Application filed February 7, 1919. Serial No. 275,613.

*To all whom it may concern:*

Be it known that I, CHARLES GREBENSTEIN, a citizen of the United States, and a resident of the city of New York, borough of Brooklyn, in the county of Kings and State of New York, have invented a new and Improved Runner Attachment for Wheeled Vehicles, of which the following is a full, clear, and exact description.

The object of the invention is to provide a new and improved runner attachment for converting baby carriages and other wheeled vehicles into sleighs to allow of conveniently running such converted vehicle over snow and ice-covered roadways during the winter season. Another object is to provide a runner attachment which is simple and durable in construction and which can be quickly placed in position and securely fastened to the front and rear wheels of the vehicle.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the runner attachment in position on the wheels of a baby carriage;

Fig. 2 is an enlarged cross section of the same on the line 2—2 of Fig. 1;

Fig. 3 is an enlarged sectional plan view of the same on the line 3—3 of Fig. 1; and Fig. 4 is an enlarged elevation of the back of the head of one of the runners.

The vehicle 10 of any approved construction is provided on each side with a front wheel 11 and a rear wheel 12, and the said front and rear wheels on each side of the vehicle are adapted to be fastened to a single runner 15 of sufficient length to accommodate both front and rear wheels. The runner 15 is provided on top with lengthwise extending grooves 16 and 17 in which are seated the bottom portions of the rims 18 and 19 of the front and rear wheels 11 and 12, and the said bottom portions of the rims 18 and 19 are securely fastened to the runner 15 by attaching devices presently described in detail. The runner 15 is provided with lengthwise extending transverse slots 20 and 21 arranged below the grooves 16 and 17, and the said slots 20 are engaged by transverse pins 22 and 23 forming part of brackets 24 and 25 extending upwardly and terminating at their upper ends in transverse arms 26 and 27 extending above the corresponding bottom portions of the rims 18 and 19. In the arms 26 and 27 screw clamping screws 28 and 29 provided at their lower ends with shoes 30 and 31 fitting onto the upper side of the corresponding bottom portions of the rims 18 and 19. It will be noticed that by screwing up the screws 28 and 29 the shoes 30 and 31 are moved firmly in contact with the rims 18 and 19 to securely fasten the latter in place on the runner 15. Each of the pins 22, 23 is provided at its base with a flange 35 fitting against the outer side of the runner 15, and the inner ends of the pins 22, 23 are provided with nuts 36 and washers 37 abutting against the inner side of the runner 15 to securely fasten the corresponding pins 22 and 23 in position on the runner. It will be noticed that by the arrangement described the clamping devices can be lengthwise adjusted in the slots 20 and 21 to accurately locate the screws 28 and 29 and their shoes 30 and 31 on the lowermost portions of the rims 18 and 19 of the vehicle wheels 11 and 12. By this arrangement the vehicle wheels can be securely and accurately fastened in place on the runner 15 and by having the grooves 16 and 17 and the slots 20 and 21 the runner will readily fit wheels 11 and 12 spaced different distances apart.

The runner 15 is provided at its forward end with an upward bend 40 terminating in a head 41 provided at the back with a recess or groove 42 in which is seated the forward portion of the rim 18 of the front wheel 11, as plainly indicated in Figs. 1 and 3. By this arrangement the rim 18 of the front wheel 11 is seated at two spaced points, that is, at the grooves 42 and 16 on the runner 15, thus holding the front wheel securely in place on the runner and without danger of the front wheels becoming accidentally disengaged from the two runners especially on running the vehicle around corners. It will also be noticed that the runner attachment is very simple in construction and can be readily placed in position on the front and rear wheels or detached therefrom whenever it is desired to do so.

Having thus described my invention, I claim as new and desire to secure by Letters Patent:—

1. A runner attachment for wheeled vehicles comprising a runner provided on top with a lengthwise extending groove forming a seat adapted for receiving the tire of a vehicle wheel in conformity thereto, said runner having an upturned forward portion provided with a head having a groove in the back thereof for engagement with a wheel, a clamping bracket adjustable longitudinally of the runner, means for positively holding said clamping bracket in adjusted position on the runner, and means forming a part of the bracket and movable toward the top of the runner to clamp the wheel between the runner and the bracket.

2. A runner attachment for wheeled vehicles, comprising a runner provided at the front with an upward bend terminating in a head, the top of the runner being provided with grooves adapted to form seats for the rims of the front and rear wheels on one side of a vehicle, the back of the said head having a groove forming a seat for engagement by the rim of the said front wheel, the runners having longitudinally extending transverse slots below the said runner grooves, clamping brackets having transverse pins extending through the said runner slots and adjustable longitudinally of the runner, and clamping screws screwing in the said brackets and engaging the said wheel rims opposite the grooves to fasten the wheel rims to the runners, said brackets having flanges at their bases engaging the outer side of the runner over the slots, and clamping means on the free ends of the pins engaging the inner side of the runner.

3. A runner attachment for wheeled vehicles comprising a runner provided on top with lengthwise extending grooves forming seats for receiving the tires of vehicle wheels and snugly fitting and conforming thereto, said grooves permitting disposition of the wheels at different points longitudinally thereof, said runner being also provided with transverse slots therethrough longitudinally disposed beneath said grooves intermediate of the ends of the latter, and clamping brackets each provided at its lower end with a flange to fit one side of the runner and a pin extending through a slot, clamping means on the pin engaging the other side of the runner, said bracket having a transverse arm extending across the top of the runner and a clamping screw engaging in the bracket arm for movement toward and away from the top of the runner, as and for the purpose specified.

CHARLES GREBENSTEIN.